United States Patent [19]

Wiseman

[11] 4,097,358

[45] Jun. 27, 1978

[54] APPARATUS FOR RELEASE OF AN ENTRAINED GAS IN A LIQUID MEDIUM

[75] Inventor: Russell M. Wiseman, Mentor, Ohio

[73] Assignee: Diamond Shamrock Corporation, Cleveland, Ohio

[21] Appl. No.: 718,833

[22] Filed: Aug. 30, 1976

[51] Int. Cl.[2] .......................... C25B 9/00; B01D 47/00

[52] U.S. Cl. ...................................... 204/270; 55/204; 55/459 R; 204/278

[58] Field of Search ................. 55/159, 184, 191, 177, 55/204, 205, 414, 424, 459 R, 460, 410; 204/270, 278; 209/211; 210/512

[56] References Cited

U.S. PATENT DOCUMENTS

| | | | |
|---|---|---|---|
| 453,105 | 5/1891 | Bretney | 210/512 R |
| 2,106,589 | 1/1938 | Bigger et al. | 55/205 |
| 2,776,053 | 1/1957 | Krebs | 209/211 |
| 2,917,131 | 12/1959 | Evans | 55/424 |
| 3,070,990 | 1/1963 | Krinov | 55/459 R |
| 3,161,490 | 12/1964 | Dudek | 55/205 |
| 3,176,501 | 4/1965 | Briggs | 55/456 |
| 3,243,941 | 4/1966 | Peterson | 55/204 |
| 3,378,405 | 4/1968 | Schumacher | 210/512 R |
| 3,415,041 | 12/1968 | Kraissl, Jr. | 55/517 |
| 3,529,405 | 9/1970 | Ashbrook | 55/191 |
| 3,715,863 | 2/1973 | Zanoni | 55/204 |

FOREIGN PATENT DOCUMENTS

| | | | |
|---|---|---|---|
| 2,134,873 | 12/1972 | France | 55/159 |

*Primary Examiner*—Bernard Nozick
*Attorney, Agent, or Firm*—Bruce M. Winchell

[57] ABSTRACT

Disclosed is a cyclone for use in conjunction with electrolytic cells for separating a gas such as hydrogen from the electrolyte solution so as to significantly increase the efficiency of subsequent cells connected in series in a large bank of electrolytic cells. The subject cyclone is especially useful in a sea water hypochlorite electrolytic cell wherein the flow rate of electrolyte is in the range of 20 to 80 gallons per minute (75 to 300 liters per minute).

8 Claims, 5 Drawing Figures

APPARATUS FOR RELEASE OF AN ENTRAINED GAS IN A LIQUID MEDIUM

BACKGROUND OF THE INVENTION

The present invention relates generally to a cyclone which is capable of separating gaseous products of an electrolytic cell from the electrolyte in a very short period of time such that the electrolyte solution passed on to the next electrolytic cell in a bank of cells will contain very little entrained gaseous products. This in turn reduces significantly the power requirements of cells toward the end of a cell bank. More particularly the present disclosure relates to an improved method for removal of entrained gaseous product from an electrolyte solution as it is being circulated from one electrolytic cell to the next electrolytic cell in a series or bank of electrolytic cells. Such a system consists of a cyclone having a tangential input into a cylindrical top section and central outlet from a conically shaped bottom portion with a baffle contained within the outlet to arrest the circular motion of the liquid.

Electrochemical methods of manufacture are becoming ever increasingly important to the chemical industry due to their greater ecological acceptability, potential for energy conservation, and the resultant cost reductions possible. Some of the reasons advanced for this possible shift in future chemical production include the possible greater restriction upon the travel of dangerous chemical products in the transportation networks of the world thus necessitating onsite manufacture, and the fact that electrolytic cells can generally be operated as a closed system thereby allowing greater control over the escape of by-products or waste products from the electrolytic cell which may be environmentally undesirable. If chemical substances are more severely regulated as it is suspected at this point, smaller on-site generation of many of these chemical substances will be necessary and electrolytic cells provide an excellent means by which such substances can be generated in small quantities economically. Also, many fuels are rising rapidly in price thus making electricity a more economical source for many types of production due to expected exhaustion of fossil fuels such as coal, gas and oil and to the use of more economical nuclear generation of electricity. The electrolytic cell promises to be one of the most efficient means of utilizing electricity.

One example of the advances in the electrolytic cell technology is the electrolysis of sea water to produce aqueous hypochlorite solution. This type of electrolytic cell utilizes available sea water to obtain chlorine in a useful form for disinfection of municipal waste water fluids and treatment of industrial cooling waters. Usually these cells are connected in series to form a bank of electrolytic cells to produce the concentrations necessary for a given production need. A particular problem of this type of cell is that by the time the electrolyte is circulated to the final cell in a bank of electrolytic cells the entrained hydrogen content of such an electrolyte is very high. This entrained hydrogen has a tendency to build up on the electrodes within the final cell and thus greatly increase the power consumption by raising the potential necessary to transmit a current across the cell.

One way to separate a gaseous substance from the liquid would be to employ gravity settling. The mixture is allowed to stand at rest or move in laminar flow along a path until the bubbles have risen to the surface. The problem with this method has been that the entrained gaseous substances in the electrolyte from an electrolytic cell are of such small bubble size that a very large system and a long period of time would be required to effect separation.

Therefore a need exists presently for a device which can release hydrogen from the electrolyte of an electrolytic cell for the production of hypochlorite at a very rapid rate and with a minimum amount of capital investment.

SUMMARY OF THE INVENTION

It is therefore an object of the present invention to provide a device for an electrolytic cell which is capable of rapid release of entrained hydrogen from the electrolyte as it passes from one cell to a second cell in a electrolytic cell bank.

It is another object for the present invention to provide a device for the release of entrained hydrogen from the electrolyte as it passes from one cell to another cell in a series of electrolytic cells such that the electrolyte will have significantly lower entrained hydrogen content so as to produce a lower cell potential and thus reduce the power consumption of the system.

It is another object of the present invention to produce a device for the release of entrained hydrogen gas from the electrolyte in a single pass system for the on-site production of hypochlorite thus eliminating the need for complex and inefficient recycle systems currently necessary with such electrolytic systems.

These and other objects of the present invention, together with the advantages thereof over existing and prior art forms which will become apparent to those skilled in the art from the detailed disclosure of the present invention as set forth hereinbelow, are accomplished by the improvements herein shown, described and claimed.

It has been found that a device for the release of an entrained gaseous substance from a liquid to accomplish the above noted objects of the invention can consist of: a cylindrical top section; a conical bottom section attached to the cylindrical top section at the larger diameter conjugate plane of the conical bottom section which is equal in diameter to the cylindrical top section; a feed line for the liquid near the top of the cylindrical top section and attached thereto in a tangential fashion so as to communicate with the interior of the device; a planar top attached to the top of the cylindrical top section; a gas release orifice in the planar top section of sufficient size as to allow the escape of the gaseous substance while severely restricting the flow of the liquid therethrough; an outlet for the liquid of the same diameter as the feed line attached to the conical bottom section at the smaller diameter conjugate plane of the conical bottom section which is equal to the diameter of the feed line to communicate with the interior of the device; and a planar baffle attached to the interior wall of the outlet so as to protrude slightly into the conical bottom section for arresting the circular motion of the liquid.

One preferred embodiment of the subject device for the release of an entrained gaseous substance from a liquid is shown by way of example in the accompanying drawings without attempting to show all of the various forms and modifications in which the invention might be embodied; the invention being measured by the appended claims and not by the details of this specification.

DESCRIPTION OF THE PREFERRED EMBODIMENT

Figure 1:
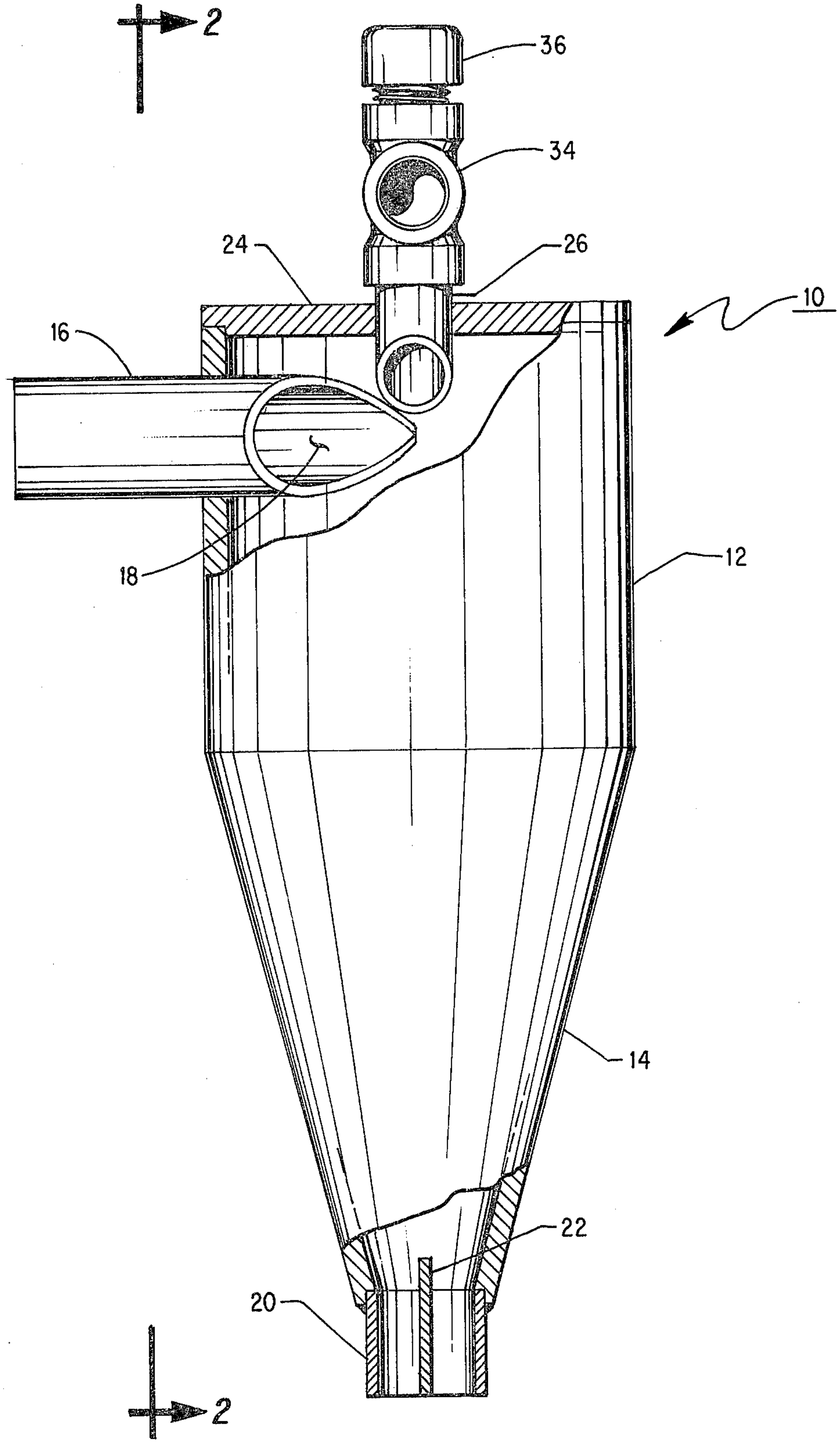
FIG. 1 is a side elevation view with a partial section view of a device for the release of an entrained gaseous substance from a liquid according to the concepts of the present invention.

Referring to the drawings numeral 10 generally refers to a cyclone to be used for the release of an entrained gaseous substance from a liquid according to the concepts of the present invention. Cyclone 10 according to the drawings is particularly suitable for the release of hydrogen gas from an electrolyte solution exiting from one electrolytic cell in a series of electrolytic cells, passing through the cyclone 10, and into the next cell in the series of electrolytic cells. The cyclone 10 would have environmental structure with respect to connection of the cyclone 10 to an electrolytic system through piping and various other means. The details of this environmental structure have not been shown for ease of illustrating the concepts of present invention.

Figure 2:
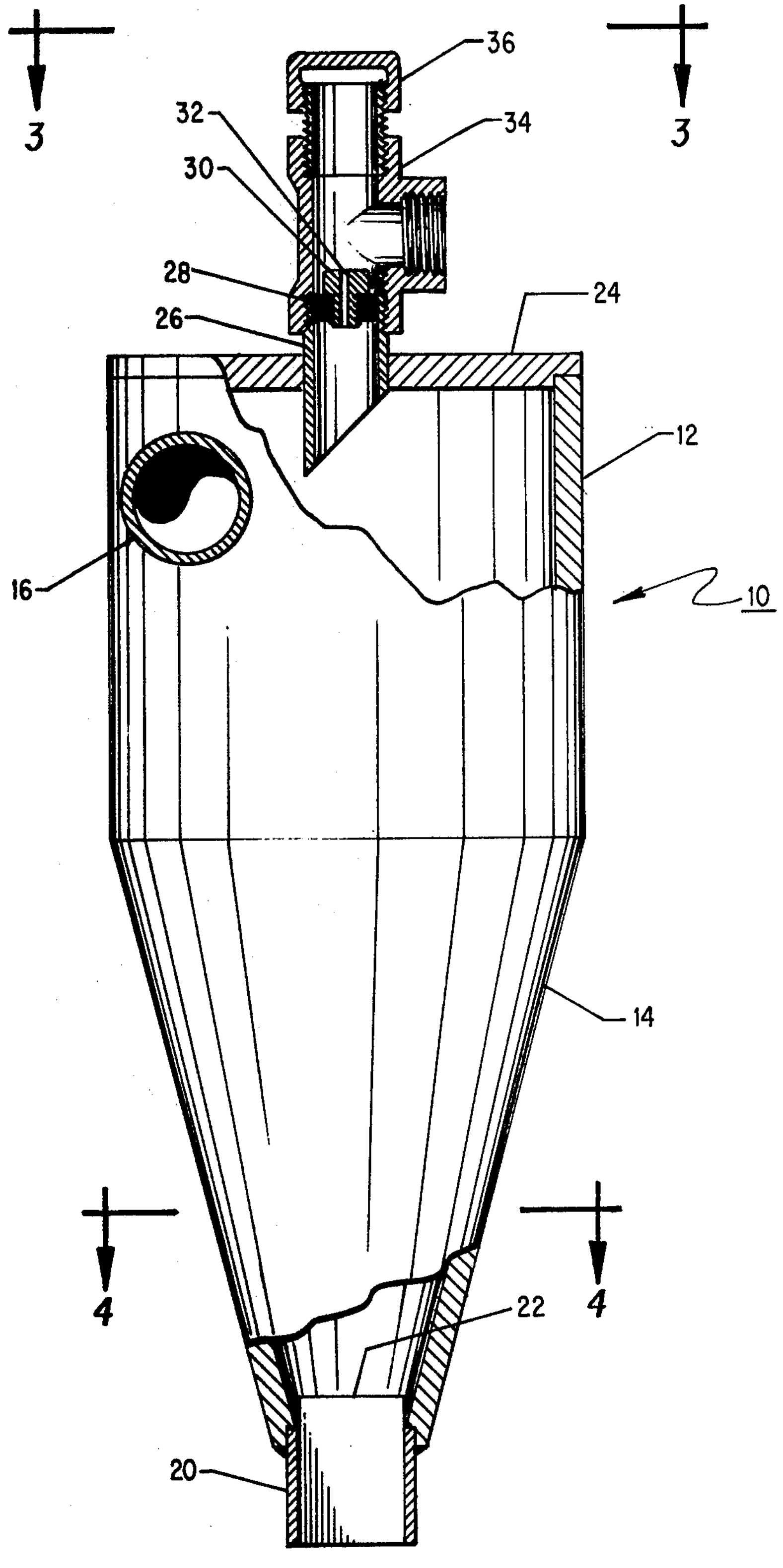
FIG. 2 is a side section view of the device with partial section views of the top and bottom portions thereof taken substantially along line 2—2 of FIG. 1.
Figure 3:
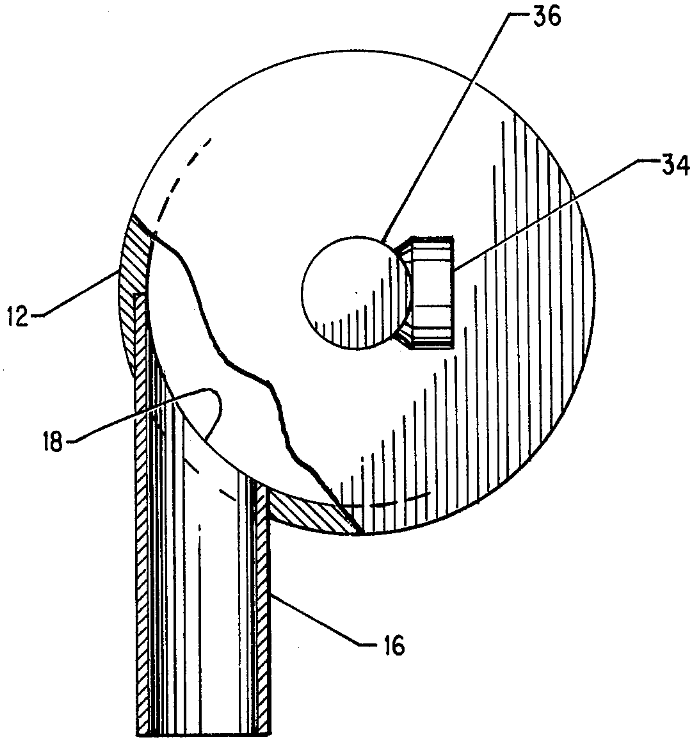
FIG. 3 is a top elevation view of the device with a partial sectional view of the feed line taken substantially along line 3—3 of FIG. 2.
Figure 4:
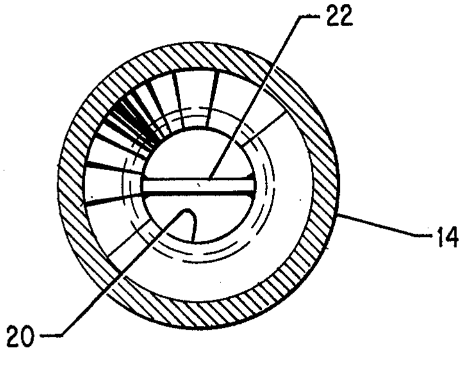
FIG. 4 is a section view of the conical bottom section and outlet of the device taken substantially along line 4—4 of FIG. 2.

Referring to FIG. 1 the cyclone 10 has a cylindrical top section 12 which connected to a conical bottom section 14 to form the basic shell of the cyclone 10. If the conical bottom section 14 were a complete cone resting on its base, then a conjugate plan as hereinafter referred to shall mean any plane which cuts the conical section to define circle at the intersection and is parallel to the base of the cone. Therefore, by varying the position vertically of the conjugate plane through the cone, the diameter of the circular intersection between the cone and the plane will vary in direct relationship. The conical bottom section 14 is joined to the cylindrical top section 12 at the larger diameter conjugate plane of the conical bottom section 14 which is equal in diameter to the cylindrical top section 12. Near the top of the cylindrical top section 12 is a feed line 16. The feed line 16 should enter the cylindrical top section 12 at a tangent to the interior surface of the cylindrical top section 12 so as to form an eliptical opening 18 for communication of the feed line 16 with the interior of cyclone 10. It can be seen in FIG. 2 that the outermost edge of feed line 16 is exactly tangent with the inside surface of cylindrical top section 12 so that flow through feed line 16 into cyclone 10 will be in a circular pattern about the interior surface of cylindrical top section 12. As a liquid falls due to gravity down toward the conical bottom section 14 this circular motion of the liquid will be increased in intensity and constricted in diameter until the liquid reaches the bottom of conical bottom section 14. The conical bottom section 14 has an outlet 20 by which the liquid medium may exit from the cyclone 10. The outlet 20 is sized to handle a liquid flow equal in volume to the feed line 16 so as to provide no constriction of the liquid flow through the cyclone 10 and is connected at the smaller diameter conjugate plane which is equal in diameter to the outlet 20. Positioned within the entrance to the outlet 20 and exit from the conical bottom section 14 is a baffle 22 as best seen in FIGS. 2 and 4 of the drawings. This baffle 22 serves to arrest the circular motion of the liquid as it enters into the outlet 20. This insures good liquid flow out of cyclone 10. Down stream from outlet 20 a valve may be desirable to create some back pressure to maximize the gaseous substance separation process. However, if the subject cyclone 10 is used in a series of sea water hypochlorite cells, the cells themselves will create sufficient back pressure for excellent separation. It is believed that any type of baffle which would arrest circular motion within the cyclone 10 will accomplish this purpose but it has been found that a planar baffle constructed according to the drawings is especially suitable for this purpose in that a solid piece of material is integrally welded across the center of the outlet 22 and extending a short distance up into the conical bottom section 14.

The cyclone 10 has a planar top 24 attached to the opposite end of the cylindrical top section 12 so as to form a closed container in the form of cyclone 10. In approximately the center of planar top 24 is a piece of tubing 26 bored therethrough and sealingly engaged to the planar top 24. The end of the planar tube inserted through the planar top 24 has a 45 degree angular cut such that the longest end extends toward the feed line 16 to prevent the splashing of liquid into the tube 26. The other end of tube 26 extending to the exterior of the cyclone 10 has a solid plug 28 sealingly secured therein. A center portion of the plug has been drilled and tapped so as to accept a threaded bolt 30 which contains a gas release orifice 32 through the center thereof.

A convenient means for providing for the connection of the gas released from the cyclone 10 to its piping system is to connect a tee joint 34 to the portion of tubing 26 which extends exterior of the cyclone 10. The straight end of tee 34 can be tapped so as to receive a plug 36 therein in sealing engagement. The angular opening of tee 34 may then be connected to a convenient piping system to exhaust the gaseous substance from the area. When it is desirable to change the gas release orifice 32 size, plug 36 may be conveniently withdrawn and a socket wrench may be used to faciley withdraw bolt 30 to replace it with a second bolt 30 having a gas release orifice 32 of different dimensions to meet the requirements of the given situation. Thereafter plug 36 may be reinserted in sealing matter so as to provide a closed system for the transport of the gaseous substance away from the area.

The components of cyclone 10 may be made from any material having the inherent mechanical strength and chemical resistance to the solutions involved in its use. It is convenient to make all of the components from the same material. Polyvinyl chloride and polypropylene have been found to be suitable examples of such materials. The bolts 30 though are more suitable when metallic nature since a more precise orifice 32 size may be maintained. A suitable example would be titanium.

Cyclone 10 is very useful for instance with an on-site hypochlorite generation electrolytic cell as exemplified and further described in U.S. Pat. Numbers: 3,779,889; 3,819,504; 3,849,281; 3,864,237 and 3,893,902. The hypochlorite electrolytic cell or sea water cell as they are more commonly referred to also produce hydrogen gas as a by-product. For instance in a single pass hypochlorite generating process producing two grams per liter available chlorine in solution, the electrolyte will have approximately 46 percent by volume entrained hydrogen in the fluid. This hydrogen gas tends to blanket the electrodes, increasing the cell potential and power consumption. There is therefore great advantage to separating the hydrogen gas from the solution during electrolysis. Some manufactures of the hypochlorite cells accomplish this by recycling the electrolyte so that the solution is allowed to lie in a recycling tank until hydrogen gas evolves therefrom, but the desired chlorine strength of the solution increases to such extent as to cause poor current efficiency due to the cell potential increase. Also such practices create long process lag times making automatic feedback control difficult. With cyclone 10 inserted in between electrolytic cells in a series of electrolytic cells a single pass system can be used which maintains the chlorine content at a given desired strength while allowing for the rapid evolvement of hydrogen gas from the fluid.

A gas release orifice 32 is sized for a maximum hole area to pass a maximum of one percent of the total liquid flow can be arrived at by using the equation:

$$A = (Q/0.61\sqrt{2gh}),$$

wherein Q equals the flow rate, $g$ is the gravity constant, and $h$ is the head. The next consideration for the sizing of the gas release orifice 32 is, will the orifice pass enough hydrogen gas? This can be shown by applying the equation as further described in ASME Power Test Code No. 10 for 1948, hereby incorporated by reference.

It has been found that the orifice sizes of Table 1, below, are suitable for a series of two or three sea water hypochlorite cells connected in series.

TABLE 1

| Flow Rate of Cell Brine | Orifice Size |
|---|---|
| 20 gal/m (75 l/m) | 1/16 inch (1.59 mm) |
| 40 gal/m (150 l/m | 3/32 inch (2.38 mm) |
| 80 gal/m (300 l/m | 1/8 inch (3.18 mm) |

It has been found that for a series of sea water hypochlorite electrolytic cells having a flow rate of approximately 20 gal/m (75 l/m) a suitable cylindrical top section 12 would be about 6 inches (152 mm) in diameter, 6 inches (152 mm) in length and have a 1.5 inch (38 mm) feed line 16. The conical bottom section 14 would be about 10 inches (254 mm) in length and have a 1.5 inch (38 mm) outlet 20. For a series of sea water hypochlorite electrolytic cells having a flow rate of approximately 80 gal/m (300 l/m) a suitable cylindrical top section 12 would be about 12 inches in diameter (304 mm), 12 inches (304 mm) in length and have a 3 inch (76 mm) feed line 16. The conical bottom section 14 would be about 20 inches (508 mm) in length and have a 3 inch (76 mm) outlet 20.

Figure 5:
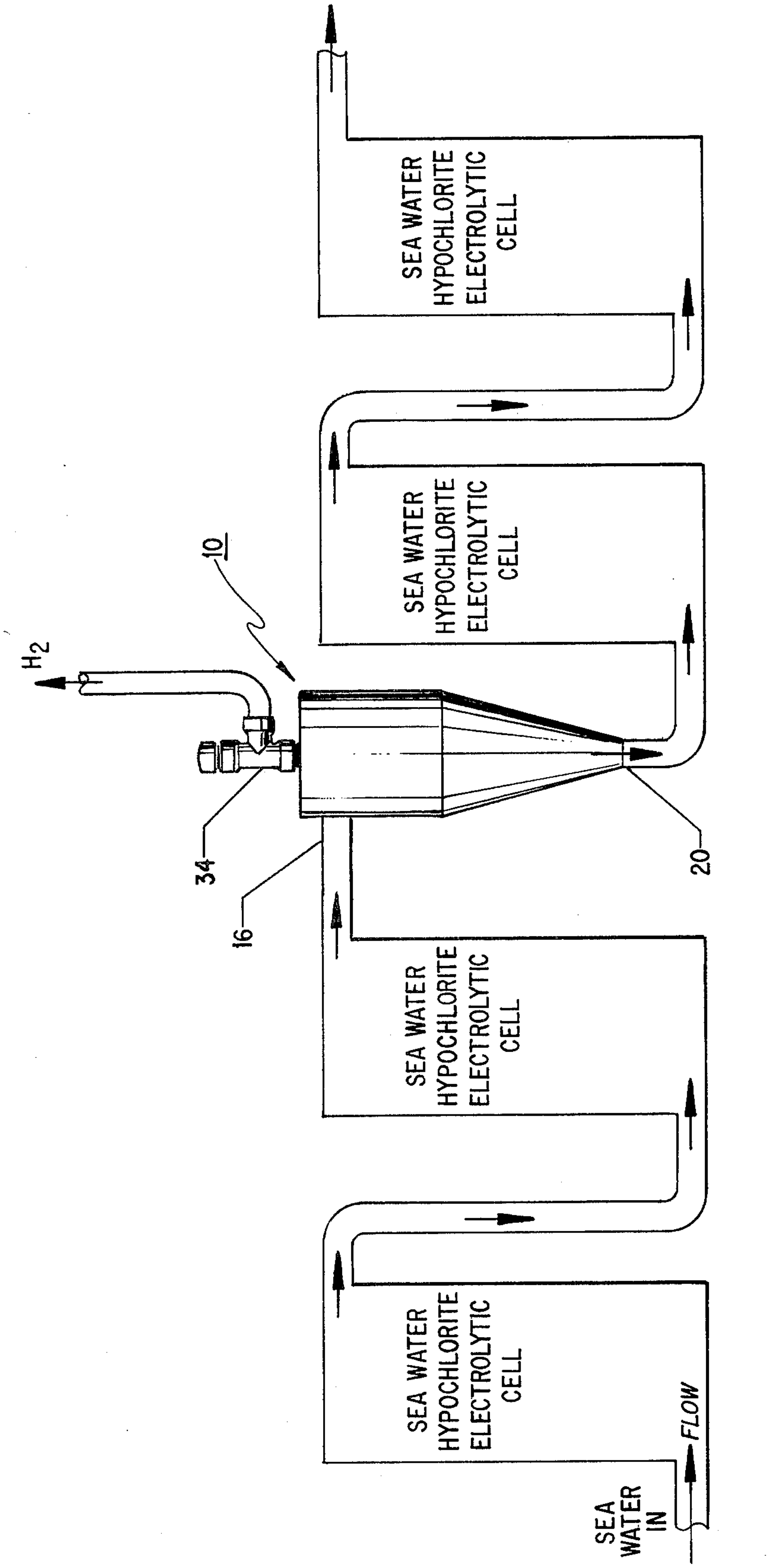
FIG. 5 is a box form view of the use of the device in series with two sets of sea water hypochlorite electrolytic cells.

Since one of the sea water cells of current design produces a maximum of 1.23 cubic feet of hydrogen gas per minute, orifice of the sizes mentioned above are capable of handling the hydrogen produced by one, two or three electrolytic cells of the given flow rate size as exemplified by FIG. 5 of the drawings. Therefore, one cycle 10 can be placed in series with one or two electrolytic cells to obtain maximum allowances for hydrogen build up within the electrolytic cells.

Thus, it should be apparent from the foregoing description of the preferred embodiment that the devise for the release of an entrained gaseous substance from a liquid herein shown and described accomplishes the object of the invention and solves the problems attendant to gaseous build up in sea water electrolytic cells for the production of on-site hydrochlorite.

What is claimed is:

1. A device for the release of an entrained gaseous substance from a liquid comprising: a cylindrical top section; a conical bottom section attached to said cylindrical top section at the larger diameter conjugate plane of said conical bottom section which is equal in diameter to said cylindrical top section; a feed line for the liquid near the top of said cylindrical top section and attached thereto in a tangential fashion so as to communicate with the interior of the device; a planar top attached to the top of said cylindrical top section; tubing extending through said planar top so as to communicate with the interior of the device; at the exterior end of said tubing, a plug sealingly engaged therein with the center drilled and tapped to receive an orifice containing bolt; said bolt having a gas release orifice of sufficient size as to allow the escape of the gaseous substance while severely restricting the flow of the liquid therethrough; an outlet for the liquid of the same diameter as the feed line attached to said conical bottom section at the smaller diameter conjugate plane of said conical bottom section which is equal to the diameter of said outlet to communicate with the interior of the device; and a planar baffle attached to the interior wall of said outlet so as to protrude slightly into said conical bottom section for arresting the circular motion of the liquid.

2. A device for the release of an entrained gaseous substance from a liquid according to claim 1 wherein the attachment of said feed line for the liquid near the top of said cylindrical top section in tangential fashion results in a eliptical opening into the interior of the device such that the outermost edge of said feed line is exactly tangential to the interior surface of said cylindrical top section.

3. A device for the release of an entrained gaseous substance from a liquid according to claim 1 wherein said tubing extending through said planar top, has a 45° angle cut on the interior portion of said tubing and aligned in a position such that the furthest extension is toward said feed line.

4. A device for the release of an entrained gaseous substance from a liquid according to claim 1 wherein said bolt has said gas release orifice size in the range of 1/64 to ¼ inch (0.4 to 6.35 mm).

5. A device for the release of an entrained gaseous substance from a liquid according to claim 4 wherein a tee fitting is connected to the outer portion of said tubing and a plug is fitted to the straight end of said tee to allow removal and changing of said bolt and the 90° angular opening of said tee is connected to an exhaust piping system for the gaseous substance once released.

6. A device for the release of an entrained gaseous substance from a liquid according to claim 1 wherein said feed line is connected to the output of a hypochlorite generating sea water electrolytic cell; said outlet is attached to the input of the next hypochlorite generating sea water electrolytic cell in a series of cells; and said gas release orifice is connected to an exhaust piping system.

7. A device for the release of an entrained gaseous substance from a liquid according to claim 6 wherein the device is connected between every two sea water hypochlorite generating electrolytic cells in a series of electrolytic cells.

8. A device for the release of an entrained gaseous substance from a liquid according to claim 7 wherein the flow rate from the hypochlorite generating sea water cell is in the range of 20 to 80 gal/m (75 to 300 l/m); said cylindrical top section has measurements in the range of 6 to 12 inches (152 to 304 mm) in diameter and in length; said conical section has a length in the range of 10 to 20 l inches (254 to 508 mm); both said feed line and said outlet have a diameter in the range of 1.5 to 3 inches (38 to 76 mm); and said gas release orifice has a diameter in the range of 1/64 to $\frac{1}{4}$ inch (0.4 to 6.35 mm).

* * * * *